United States Patent [19]
Gerry

[11] 3,908,274
[45] Sept. 30, 1975

[54] NAVIGATIONAL AID

[76] Inventor: Julian E. Gerry, 5809 Murietta Ave., Van Nuys, Calif. 91401

[22] Filed: Oct. 19, 1973

[21] Appl. No.: 407,877

[52] U.S. Cl. ............................. 33/1 SD; 33/75 R
[51] Int. Cl.² ........................................ G01C 21/20
[58] Field of Search........ 33/1 SD, 1 SB, 1 SA, 1 N, 33/76 VA, 104, 75 R

[56] References Cited
UNITED STATES PATENTS

| | | | |
|---|---|---|---|
| 665,316 | 1/1901 | Fay | 33/100 |
| 1,292,337 | 1/1919 | Lindberg | 33/75 R |
| 1,899,318 | 2/1933 | Dixon | 33/104 |
| 2,004,951 | 6/1935 | Jensen | 33/1 N |
| 2,007,986 | 7/1935 | Sprague | 33/1 SD |
| 3,208,149 | 9/1965 | Zachs | 33/157 |
| 3,540,127 | 11/1970 | Kane | 33/1 SD |
| 3,665,607 | 5/1972 | Clark | 33/1 SD |

Primary Examiner—Richard E. Aegerter
Assistant Examiner—John W. Shepperd

[57] ABSTRACT

A navigation aid is disclosed herein for rapidly determining the precise angular position of an aircraft from transmitted radio signals with respect to magnetic north. The aid includes a base member having a disc rotatably mounted thereon and a pair of arcuate slots superimposed upon each other in the base member and disc respectively. A securement fastener disposed in the registered slots for releasably holding the disc in a selected position on the base member. The disc is provided with a zero marker while the base member is provided with a plurality of parallel spaced apart lines intended to be aligned with grid lines on a chart representing a true north direction.

2 Claims, 5 Drawing Figures

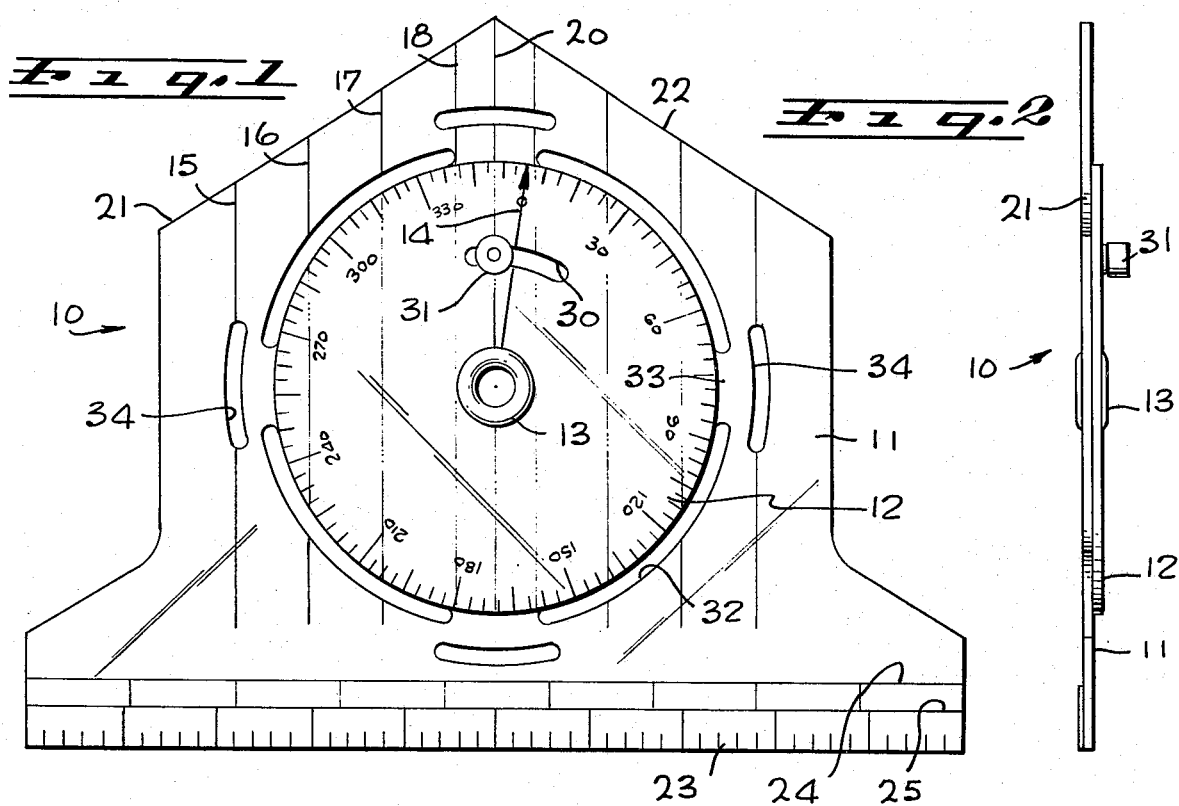
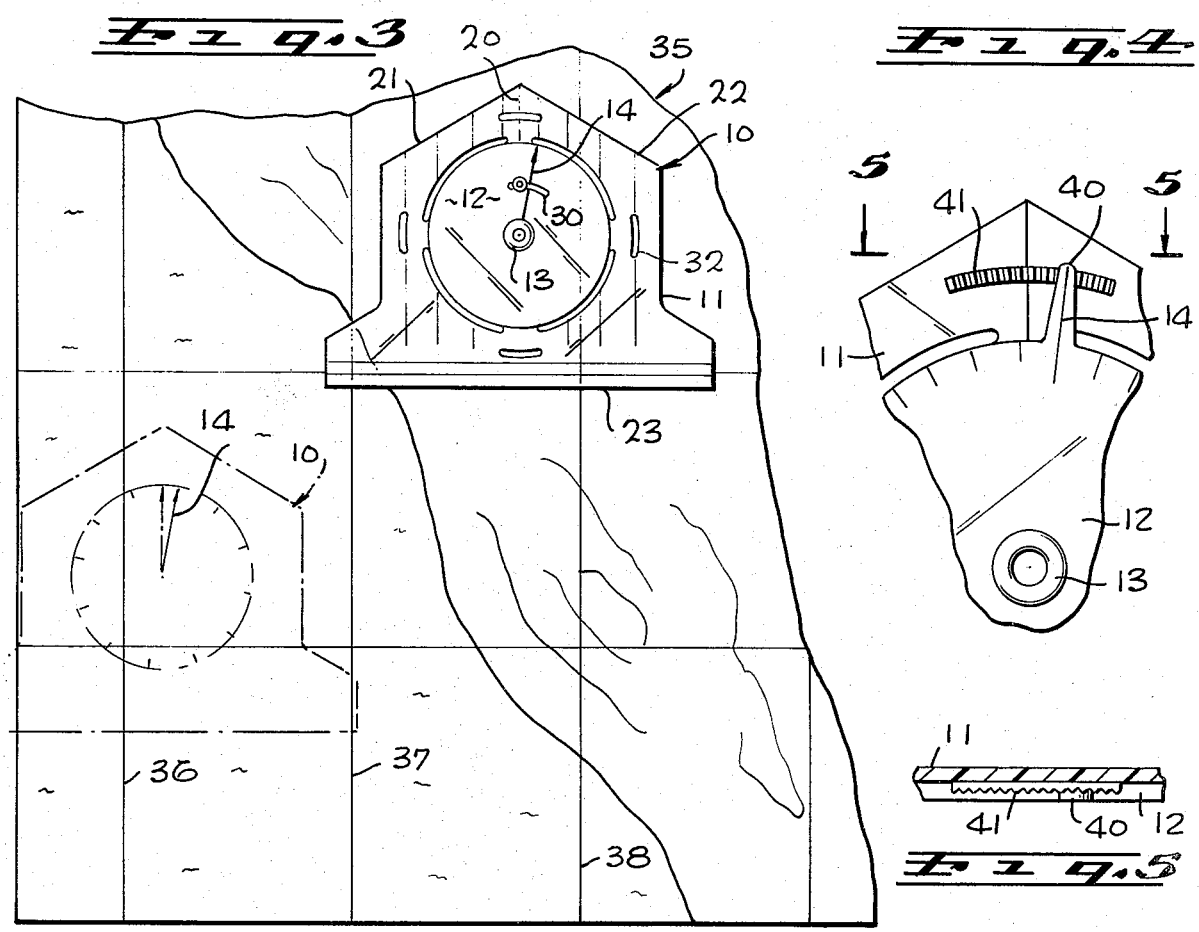

NAVIGATIONAL AID

BACKGROUND OF THE INVENTION

1. Field of the Invention

This invention relates to navigational aids of the portable type and more particularily to a novel aid having a disc rotatable with respect to a base member for indicating magnetic north with respect to true north.

2. Description of the Prior Art

In the field of navigation, it is the conventional practice to use a chart having spaced parallel grid lines extending across the face of the chart indicating a north-south true direction. However, since vehicle travel, such as an aircraft employs a magnetic compass, the aircraft course or heading must be converted from a true direction to a magnetic one. This conversion, sometimes known as compass error, is composed of two general factors which are algebraically combined with the true course or heading to provide the pilot or operator with a magnetic compass heading. These two factors are known as variation and deviation. Magnetic meridians indicate the direction of the earth's magnetic field; but only in a very few places do the magnetic and true meridians coincide. The difference at any location between the directions of the magnetic and true meridians in the variation. Variation is the horizontal component of a magnetic line of force. Deviation relates to the divergence caused between the north-south axis of a compass card and the magnetic meridian. This divergence is caused by immediate or local magnetic properties adjacent the compass itself. A navigator can find the correct variation for a given locality by referring to the chart of that locality. Deviation is more difficult to ascertain since it varies not only on different vessels, but on any particular vehicle, it varies with changes in the vehicles heading.

In finding variation for a particular locality, the chart is provided with a compass rose having true direction with relation to true north and magnetic direction with relation to magnetic north arranged in connection circles and printed in several specific locations on the face of the chart. The variation is printed as a part of the compass rose.

It is inconvenient to plot a course on the chart when compass bearings are used and must be converted to true bearings as well as the reverse. It is particularly difficult when the compass rose is not printed on the chart in the immediate vicinity of the fix or bearing coordinates. At this time, conversion must take place which leads to mathematical error, particularly when the navigator is under pressure.

Therefore, a long standing need has been present for a navigational aid which may be portable and movable over the face of a chart and which compensates for magnetic variation. Several attempts have been made to provide navigational or geometric aids which are represented in the disclosures of U.S. Pat. Nos. 3,034,713; 3,093,905 and 2,967,016. However, the disclosured devices are difficult to align with reference characters on a chart and do not have means for inhibiting rotation between movable elements.

SUMMARY OF THE INVENTION

Accordingly, the above problems and difficulties have been obviated by the present invention which provides a novel geometric aid for aerial navigation adapted to be used with a magnetic compass and an air navigational chart wherein the aid allows ready conversion between magnetic north bearings indicated by the magnetic compass or by radio magnetic bearings and true north bearings which needed when determining location on a chart. In one form, the aid comprises a pair of rigid transparent sheets of material which are fastened together by a fastening means so that one sheet may rotate with respect to the other. A compass rose centered on the fastening means axis, is printed on one sheet; degree markings delineating angles from about minus 20° to positive 20° are printed on the second sheet near the north (zero degrees) mark on the compass rose so that they may be oriented to correct for magnetic variation. A plurality of evenly spaced parallel lines are scribed on the second sheet which are adapted to be placed in alignment with true north-south lines on a navigational chart. Thus, the compass rose becomes a magnetic compass rose which may be placed anywhere on the face of the navigational chart.

Therefore, it is among the primary object of the present invention to provide a portable navigational aid which converts true north to magnetic north so that the aid represents a portable magnetic compass rose.

Another object of the present invention is to provide a portable navigational aid operable in combination with north-south grid lines on a navigational chart to function as a magnetic compass rose without reference to the conventional printed compass rose on the face of the chart.

Still a further object of the present invention is to provide a navigational device permitting fast and precise angular position from signals received from VOR stations via radio beacon signals.

A further object of the present invention is to provide a navigational aid having the purpose of setting up magnetic bearings as related to charts that are oriented true north.

Still further object of the present invention is to provide a novel navigational device permitting the navigator to draw lines on his chart in the proper magnetic north relation with respect to true north and to measure these lines for distance and angles relative to magnetic.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a front plan view of the novel navigational aid incorporating the present invention;

FIG. 2 is an end elevational view of the navigational aid shown in FIG. 1;

FIG. 3 is a reduced drawing of the navigational aid used in connection with the pictorial face of a chart;

FIG. 4 is a fragmentary elevational view of another embodiment of the present invention; and FIG. 5 is a transverse cross-sectional view of the device shown in FIG. 4 and taken in the direction of arrows 5—5 thereof.

DESCRIPTION OF THE PREFERRED EMBODIMENT

Referring to FIG. 1, a novel navigational aid of the present invention is indicated in the general direction of arrow 10 which comprises a first sheet of transparent material identified by numeral 11 and a second sheet of transparent plastic material indicated by numeral 12. Both sheets 11 and 12 are are rotatably secured with respect to each other by rivet 13. It is to be noted that sheet 12 takes the form of a circular disc and includes a plurality of compass degree markings delineating angles carried on the edge marginal region adjacent the periphery or circumference of the disc. For purposes of simplicity, angles marked in degrees 0 – 90 are clearly illustrated. It is to be understood that the zero degree includes an arrow marker indicated by numeral 14.

A plurality of evenly spaced lines indicated by numerals 15 – 18 are printed on sheet 11 in parallel spaced apart relationship so as to permit alignment of sheet 11 which any true north-south grid lines on a navigational chart when the aid 10 is placed on the chart. It is to be understood that additional lines similar to lines 15 – 18 are provided on the opposite side of sheet 11 and are identical in spaced parallel relationship. Furthermore, a line 20 is also provided on sheet 11 and passes thru the rivet axis joining the two sheets together by the rivet 13. Line 20 may represent true north and the angular displacement between line 20 and arrow line 14 will indicate the variation between true north and magnetic north. It is also to be noted that the upper edge of sheet 11 includes edges 21 and 22 which converge towards one another to meet at the end of north line 20 so as to serve as a optical pointer. The opposite edge of sheet 11 indicated by numerals 23 includes a distance scale in both statute miles and nautical miles as indicated by numerals 24 and 25 respectively.

Both sheets 11 and 12 are provided with concentric and registered arculate slots indicated collectively by numeral 30. Disposed within the slot is a releasable fastener 31 which when secured, retains sheet 11 and 12 in fixed position with respect to each other. The fastening means 31 may be of any releasable screw type or clip type fastening means that may be readily secured or unsecured to hold or release the sheets with respect to each other. By this means, the arrow marker 14 may be placed at a suitable angular distance from the true north line 20 and this angular distance may be maintained by securing fastener 31. It is also to be noted that the sheet 11 also includes a plurality of arculate slots such as is indicated by numeral 32 that are located just beyond the periphery of sheet 12. The opposing ends of slots 32 are separated by a bridge of material indicated by numeral 33 which connects the central portion of sheet 11 to the outer portion of the sheet. The arculate slots 32 are arranged in a circle about a disc sheet 12 and may be employed for permitting a pencil to be inserted into the slot for marking the chart beneath the aid 10. Furthermore, a plurality of secondary arculate slots, such as indicated by numeral 34 are provided adjacent of the bridge portion 33 which may also be employed to receive a pencil for marking the chart therebeneath.

Referring now to FIG. 2, it can be seen that the rivet fastener 13 holds the sheets 11 and 12 together so that rotation may be permitted. It can also be seen that the releasable fastener 31 will prevent rotation when it is tightened.

Referring now in detail to FIG. 3, the navigational aid 10 is shown in use in connection with a conventional aerial navigation chart 35. The chart includes a plurality of spaced apart parallel grid lines indicated by numerals 36, 37 and 38. These grid lines run north-south in a true direction. When it is desired to employ the aid 10, the magnetic heading is set into the device by rotating the disc 12 with respect to sheet 11 so that the angle between north line 20 and arrow index marker 14 is equal to the variation for the particular locality. The variation is derived from the compass rose printed on the face of the map or chart 35. However, as is often the case, the compass rose is not near the position being determined by the navigator and hence the magnetic headings on the printed compass rose are not available. However, by placing the north-south lines 15 – 18 in overline alignment with the grid lines 36, 37 and 38, the magnetic heading may then be read directly from the degree scale provided on the circular edge of disc 12. As indicated in broken lines, the navigational aid 10 may be moved to another location and used in the same manner.

In view of the foregoing, it can be seen that the navigational aid 10 of the present invention provides a simple, foolproof, easy to read and specificly tailored device for the purpose of setting up magnetic heading as related to charts that are oriented true north. This is the one parameter in activities such as aviation that is not clearly presented by aircraft or vehicle instruments and this one parameter must be adjusted according to a particular locale. The device is extremely useful for airborne use in establishing a position or "fix" and/or to create a new or revised course to a given destination. While flying, the pilot navigator is hard pressed to control his aircraft, refer to his charts, establish his position, and to generate new heading. While on the ground, the pilot can use any number of complex devices to set up his plan in advance. However, once in the air, particularly if the pilot feels he is lost, the more simple and foolproof devices will be used. To establish his location or to generate a new heading the pilot navigator will need to draw lines on his chart in the proper magnetic north relation and to measure these lines for length (distance) and angle relative to magnetic north. The navigational aid of the present invention is designed to perform this function. The device can also be used for the same purpose on the ground for preflight planning.

The device of the present invention provides for an adjustable magnetic north offset by means of slots 30 and the retainer 31 so as to permit the setting of arrow 14 at an angle with respect to the line 20. This device locks the sheets together so as to retain the magnetic north offset from the true north. The device is a means for aligning the true north at any placement on a "true north" chart. The pencil slots 32 and 34 are conveniently placed in the sheets and by providing an open grommet hole within the center of rivet 13, the hole may be employed for centering the portable compass rose over an objective. Straight edge 23 may be employed for drawing lines and measuring distances employing the nautical scale 25 or the statute mile scale 24. The magnetic north oriented compass rose is easy to locate since the device is portable and is convenient to read since arrow 14 indicates the magnetic north.

Referring now to FIGS. 4 and 5, another embodiment of the present invention is shown wherein the slots 30 and releasable fastener 31 are modified by providing an elongated projection 40 having the magnetic north arrow 14 carried thereon. The extreme end of the projection 40 includes a downwardly depending element engagable with a plurality of ridges or indentation 41 so that the rotary movement of the disc 12 with respect to the sheet 11 is controlled thereby. Therefore, variation may be applied to the device by rotating the projection 40 over the ridges 41 and stopping rotation at a desired degree or angular position between the magnetic north arrow 14 and the true north line 20 on sheet 11. The operation of the modification is identical to that previously described with respect to the embodiment shown in FIGS. 1 – 3 inclusive.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a portable navigational aid for providing a course and bearing computation in conjunction with a sectional chart having a vertical north/south parallel grid lines, said aid comprising:

a pair of independently rotatable parts mounted to each other in a facing relationship and at a common center for rotation thereabout;

the first of said parts being completely circular including bearing indicia about its circumference, with a zero-index marker extending radially from such circumference;

the second of said parts being transparent and having a greater peripherial dimension than that of the first of said parts, and including spaced parallel lines for proper alignment to said sectional map grid lines onto which said aid is to be mounted for use;

the improvement comprising, said second of said parts including means defining at least one slotted opening contiguous to and along the circumference of said first of said parts;

means mounted on the facing sides of said marker and second of said parts for mutually engaging said parts in a fixed angular position, the means on said second of said parts being disposed arcuately across one of said spaced parallel lines;

said slotted opening comprises a plurality of arcuate slotted openings arranged in a 360° circle about the periphery of said first part and said second part having a bridge portion joining opposing ends of said plurality of slotted openings;

an additional slotted opening adjacent to and spaced from each of said bridge portions carried by said second part;

said first part is a disc and said second part is substantially square with a pointed portion projecting outwardly from one side thereof; and additional indicia carried along the side of said second part opposite to said side carrying said pointed portion wherein said additional indicia is related to distance measurements.

2. The invention as defined in claim 1 wherein said means for mutual engagement includes an elongated projection carried on said disc and a plurality of serrations carried on said second part forciably engaged by said projection in yieldable sliding relationship.

* * * * *